Figure 1:
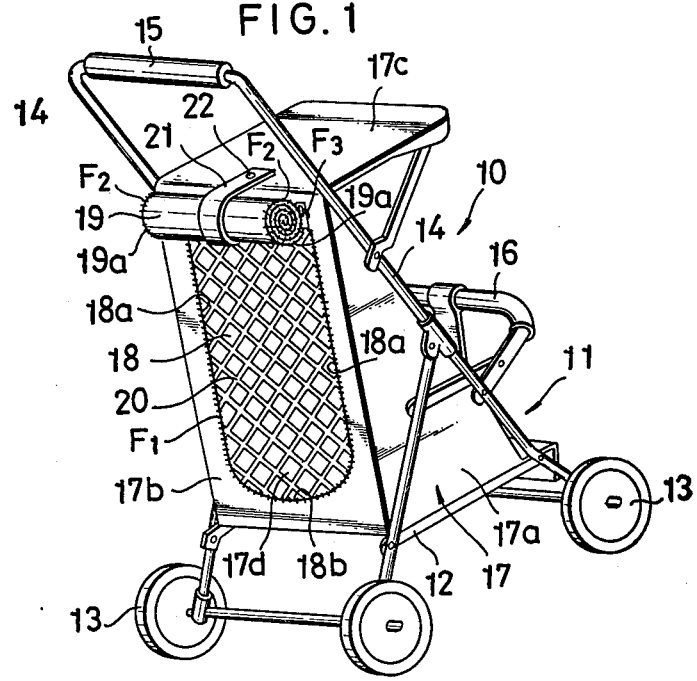

United States Patent [19]

Matsuda

[11] 4,072,345
[45] Feb. 7, 1978

[54] BABY CARRIAGE
[75] Inventor: Akiko Matsuda, Nyuzen, Japan
[73] Assignee: Yoshida Kogyo K.K., Japan
[21] Appl. No.: 754,519
[22] Filed: Dec. 27, 1976
[51] Int. Cl.$^2$ .............................................. A47C 7/36
[52] U.S. Cl. .................................... 297/184; 297/453; 5/364; 297/452
[58] Field of Search ................ 297/452, DIG. 4, 203, 297/184, 180, 453, 223; 135/14 D; 160/DIG. 18, 243; 5/364

[56] References Cited
U.S. PATENT DOCUMENTS

| | | | |
|---|---|---|---|
| 192,203 | 6/1877 | Wakeman | 297/283 |
| 740,661 | 10/1903 | Klein | 297/180 |
| 1,393,461 | 10/1921 | Steele | 297/184 X |
| 1,770,841 | 7/1930 | Clyman | 5/364 |
| 1,853,579 | 4/1932 | Sallop | 297/223 |
| 2,249,927 | 7/1941 | Abramson | 160/DIG. 8 |
| 2,391,871 | 1/1946 | Benson | 160/DIG. 18 |
| 2,546,843 | 3/1951 | Zigterman | 5/364 |
| 2,735,716 | 2/1956 | Shimabukuro | 5/364 X |
| 3,006,688 | 10/1961 | Ouellette | 297/453 X |

Primary Examiner—Francis K. Zugel
Attorney, Agent, or Firm—Bucknam and Archer

[57] ABSTRACT

A baby carriage comprises a frame structure and a compartment for accommodating an infant, the compartment being formed by substantially air-tight materials and including a back rest having formed therein an opening. A perforated member extends substantially coextensively with and over the opening. There is provided a cover coextensive with the opening and capable of covering and uncovering the opening. One of a pair of slide fastener stringers is secured to and along the marginal edges of the cover, and the other stringer to and along, the marginal edges of the opening. The stringers are coupled or uncoupled by a slider to attach the cover over the opening or detach the cover from the opening.

2 Claims, 4 Drawing Figures

BABY CARRIAGE

This invention relates to a baby carriage or the like for accommodating an infant while in transport during a shopping or a stroll.

Conventional baby carriage substantially comprise a frame arrangement which provides a compartment having all four sides covered by a canvas, artificial leather or other air-tight materials, or another frame arrangement whereby a similar compartment is provided except for the front end which is uncovered or open. Such known carriages have a drawback in that during hot season, there is generated heat in the compartment particularly at the back rest area thereof, imposing considerable discomfort upon the occupant infant and making it sweat and cry, stand up dangerously or even never ride the carriage.

It is therefore a primary object of the present invention to provide an improved baby carriage which is rendered aerative when necessary by a simple operation.

Other objects and advantages of the invention will be apparent from the following description taken in connection with the accompanying drawings which illustrate by way of example certain preferred embodiments which the invention may assume in practice.

Figure 2:
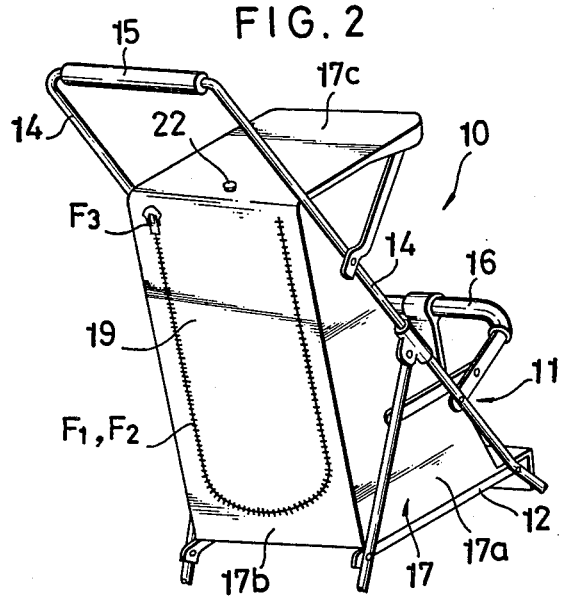
Figure 3:
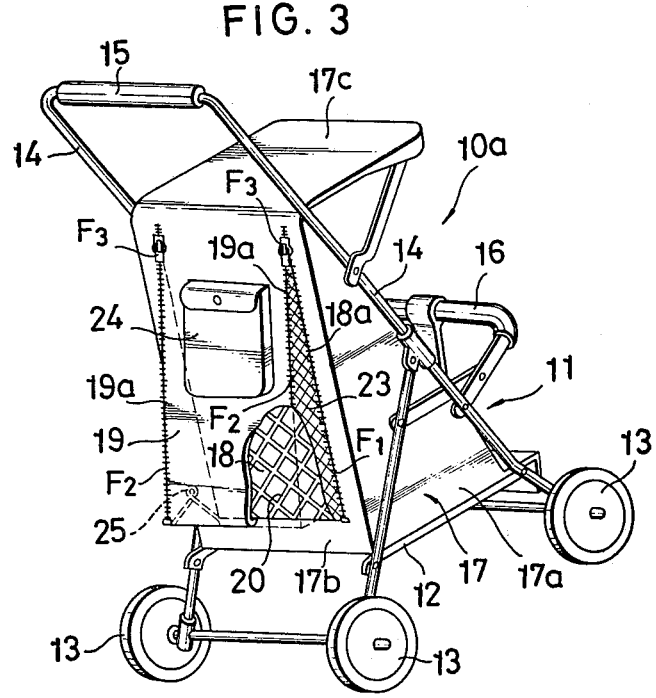
Figure 4:
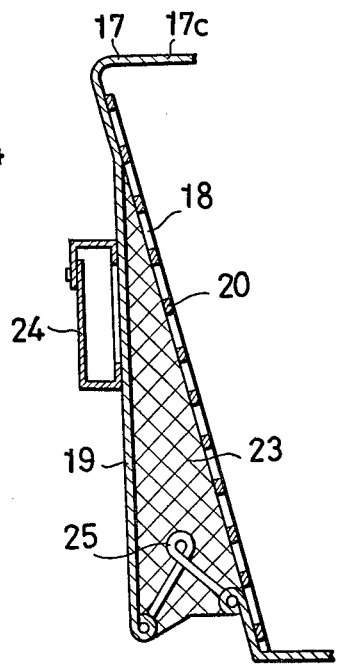

In the drawings:

FIG. 1 is a perspective view of a mobile baby carriage constructed in accordance with the principles of the invention, FIG. 2 is a view similar in part to FIG. 1 but showing the back rest closed, FIG. 3 is a perspective view of another form of baby carriage provided in accordance with the invention, and FIG. 4 is a sectional view of a portion of the carriage of FIG. 3.

Referring now to FIGS. 1 and 2, there is shown a preferred form of baby carriage constructed in accordance with the invention, the carriage designated at 10 comprising a frame structure 11 which includes a chassis 12 supporting the wheels 13, main posts 14 extending on opposite sides of the carriage at a suitable angle with respect to the longitudinal axis of the carriage, a handle portion 15 integral with the posts 14, and a front hand rail 16.

There is provided a compartment 17 for accommodating an infant, which compartment is generally in the form a hammock and has two side portions 17a, a bottom or seat portion 17d, a back rest portion 17b and a hood 17c, all such portions being made of substantially air-tight materials such as canvas or artificial leather.

The basic construction of the carriage as above described is well known, and hence no further description in this respect will be required.

According to an important feature of the invention, the back rest portion 17b in particular of the carriage 10 is provided with an opening 18 which is disposed to keep the compartment 17 aerative and which may be closed by a cover or flapper 19 in a manner hereafter explained. The opening 18 has marginal edges 18a, of which bottom portion 18b is rounded or arcuately configured as shown. To and along the edges 18a, 18b of the opening 18 is attached one slide fastener stringer $F_1$ of a pair while the other mating stringer $F_2$ is attached to the marginal edges 19a of the cover 19 which is coextensive with the opening 18. In this embodiment (FIGS. 1 and 2), there may be used only one slider $F_3$ to couple and uncouple the two mating fastener stringers $F_1$, $F_2$ throughout the continuous marginal edges of the opening 18 in the well known manner. There is provided a screen mesh, net or similar perforated member 20 supported in place and extending substantially coextensively over the opening 18 in the back rest 17b for holding the infant from falling out and keeping the compartment 17 sufficiently aerative when the cover 19 is rolled up and shown in FIG. 1. In order to retain the cover 19 thus in rolled up position, there is provided a retaining strap 21 having one end connected centrally to the back of the cover 19 and the other end buttoned or otherwise secured to the hood 17c as at 22.

Referring to FIGS. 3 and 4, there is shown a modification 10a of the carriage 10 described above, which modification 10a features the provision of a side flap member or vent 23 on each of opposite side marginal edges 18a, which member 23 is formed by any suitable aerative material such as screen mesh and secured to the respective marginal edges 18a and 19a of the opening 18 and cover 19, respectively, by means of a pair of slide fastener stringers $F_1, F_2$. This arrangement permits of the provision of a pouch 24 or the like on the cover 19 and obviates the necessity of rolling up the cover 19. The side flap member 23 is shown to be generally triangular as viewed in FIG. 4. A spring member 25 is provided at the bottom of the back rest 17b to normally spread the flap member 23 open when the slider or sliders $F_3$ are moved to disengage the tow stringers $F_1, F_2$.

What is claimed:

1. A baby carriage comprising:
   (a) a frame structure;
   (b) a compartment for accommodating an infant, said compartment being made of substantially air-tight materials and including a pair of side portions and a back rest provided with an opening therein;
   (c) a perforated member extending over said opening;
   (d) a cover for covering said opening, said cover being integral with said compartment at its upper portion of said cover and coextending with said opening;
   (e) a pair of slide fastener stringers, one of which is secured to and along the marginal edges of said cover and the other stringer to and along the marginal edges of said opening, said stringers being selectively coupled and uncoupled by a slider whereby said cover is selectively closed over and removed from said opening;
   (f) a pair of aerative members of a substantially triangular shape, each member being interposed between the respective marginal edges of said cover and said opening, said aerative members being attached immediately adjacent to and inside of said slide fastener stringers.

2. A baby carriage as claimed in claim 1 wherein there is provided a spring member at the bottom of said back rest for normally urging said cover away from said back rest.

* * * * *